(12) United States Patent  
Ghosh

(10) Patent No.: US 8,532,232 B2
(45) Date of Patent: Sep. 10, 2013

(54) ESTIMATING BIT ERROR PROBABILITY (BEP) IN AN EDGE WIRELESS SYSTEM

(75) Inventor: Kaushik Ghosh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 12/843,247

(22) Filed: Jul. 26, 2010

(65) Prior Publication Data

US 2010/0290512 A1    Nov. 18, 2010

Related U.S. Application Data

(63) Continuation of application No. 11/165,297, filed on Jun. 22, 2005, now abandoned.

(51) Int. Cl.
*H04L 27/06* (2006.01)

(52) U.S. Cl.
USPC .......................................................... 375/341

(58) Field of Classification Search
USPC ................. 375/341, 130, 147, 149, 224, 260, 375/316, 329, 340, 350, 343; 370/206, 207, 370/210
See application file for complete search history.

(56) References Cited

U.S. PATENT DOCUMENTS

| | | |
|---|---|---|
| 2002/0172302 A1 | 11/2002 | Monogioudis et al. |
| 2003/0115028 A1 | 6/2003 | Summerfield et al. |
| 2003/0123381 A1* | 7/2003 | Zhuang et al. ................ 370/208 |
| 2004/0243889 A1 | 12/2004 | Li et al. |
| 2004/0253968 A1 | 12/2004 | Chang et al. |
| 2004/0264605 A1 | 12/2004 | Kyosti et al. |
| 2005/0018794 A1 | 1/2005 | Tang et al. |
| 2005/0182807 A1 | 8/2005 | Ramaswamy et al. |
| 2006/0062363 A1 | 3/2006 | Albrett |
| 2006/0203943 A1 | 9/2006 | Scheim et al. |
| 2006/0291591 A1 | 12/2006 | Ghosh |

FOREIGN PATENT DOCUMENTS

| | | |
|---|---|---|
| EP | 1463229 A1 | 9/2004 |
| KR | 1020020030829 | 4/2002 |
| WO | WO9959274 | 11/1999 |
| WO | WO0199329 | 12/2001 |
| WO | WO2004086671 | 10/2004 |

OTHER PUBLICATIONS

International Search Report, PCT/US2006/024502, International Searching Authority, European Patent Office, Sep. 27, 2006.
Written Opinion, PCT/US2006/024502, International Searching Authority, European Patent Office, Sep. 27, 2006.
European Search Report—EP10153460—Search Authority—Munich—Mar. 25, 2010.

* cited by examiner

*Primary Examiner* — Khai Tran
(74) *Attorney, Agent, or Firm* — Won Tae Kim

(57) ABSTRACT

Distribution parameter mapping determines the bit error probability (BEP) of a burst transmitted from a base station to the mobile station using a modulation and coding scheme (MCS) specified in the EDGE standard. Depending on whether the multi-bit soft decisions of the burst most resemble a Gaussian or a Rician distribution, the statistical parameters $\mu$ and $\sigma$ or A and u are determined. The ratio $\mu/\sigma$ or $A/\sigma$ is mapped to an empirically determined BEP in a Gaussian or Rician lookup table, respectively. The BEPs are not influenced by the degree of code redundancy in the MCS. The BEPs for the four bursts in a radio block are then averaged, filtered and quantized according to the EDGE standard. The quantization level of the average BEP is reported to the base station so that subsequent radio blocks can be transmitted using an MCS that is appropriate for the estimated BEP.

31 Claims, 9 Drawing Sheets

| SCHEME | MODULATION | CODE RATE | DATA PER RADIO BLOCK | DATA RATE kbits/s |
|---|---|---|---|---|
| MSC1 | GMSK | 0.53 | 176 | 8.8 |
| MSC2 | | 0.66 | 224 | 11.2 |
| MSC3 | | 0.80 | 296 | 14.8 |
| MSC4 | | 1.0 | 352 | 17.6 |
| MSC5 | 8-PSK | 0.37 | 448 | 22.4 |
| MSC6 | | 0.49 | 592 | 29.6 |
| MSC7 | | 0.76 | 2 X 448 | 44.8 |
| MSC8 | | 0.92 | 2 X 544 | 54.4 |
| MSC9 | | 1.0 | 2 X 592 | 59.2 |

FIG. 5

GAUSSIAN DISTRIBUTION

(52) $p(x) = \dfrac{1}{\sigma\sqrt{2\pi}} e^{-\frac{1}{2}\left(\frac{x-\mu}{\sigma}\right)^2}$

(53) $m_2 = \mu^2 + \sigma^2$

(54) $m_4 = \mu^4 + 6\sigma^2\mu^2 + 3\sigma^4$

(55) $\mu = \sqrt[4]{\dfrac{3m_2^2 - m_4}{2}}$

(56) $\sigma = \sqrt{m_2 - \sqrt{\dfrac{3m_2^2 - m_4}{2}}}$

RICIAN DISTRIBUTION

(62) $p(x) = \dfrac{x}{\sigma^2} e^{-\left(\frac{x^2+A^2}{2\sigma^2}\right)} I_0\left(\dfrac{Ax}{\sigma^2}\right) u(x)$

(63) $m_2 = A^2 + 2\sigma^2$

(64) $m_4 = A^4 + 8\sigma^2 A^2 + 8\sigma^4$

(65) $A = \sqrt[4]{2m_2^2 - m_4}$

(66) $\sigma = \sqrt{\dfrac{m_2 - \sqrt{2m_2^2 - m_4}}{2}}$

FIG. 6

ESTIMATING BIT ERROR PROBABILITY (BEP) IN AN EDGE WIRELESS SYSTEM

CLAIM OF PRIORITY UNDER 35 U.S.C. §120

The present Application for Patent is a continuation of patent application Ser. No. 11/165,297 filed Jun. 22, 2005, currently pending, assigned to the assignee hereof and hereby expressly incorporated by reference herein.

BACKGROUND

1. Field

The present disclosure relates generally to wireless communication devices and, more specifically, to a method for estimating the bit error probability (BEP) in a wireless channel between a base station and a mobile station.

2. Background

As mobile telecommunications evolves, increasing speeds of data transmission to mobile stations enables new types of services to be offered to mobile subscribers. Usage of these services, in turn, generates a demand for ever increasing data rates. The European Telecommunications Standards Institute (ETSI) introduced the General Packet Radio Service (GPRS) as an initial standard to increase data rates by providing packet-switched data to mobile stations based on the Global System for Mobile communications (GSM). Then as an enhancement to GSM data services, ETSI promulgated the Enhanced Data rates for GSM Evolution (EDGE) standard, with a packet-switched portion called Enhanced GPRS (EG-PRS). Together, EDGE and EGPRS are described in the TIA/EIA-136-370 standard published by the Telecommunications Industry Association (TIA). Further enhancements to high-speed data transmission based on GSM include the GSM/EDGE radio access network (GERAN) standard specified by the $3^{rd}$ Generation Partnership Project (3GPP). The TIA has described the GERAN enhancements in the TIA/EIA-136-370-A revision to its EGPRS-136 standard. For simplicity, the EDGE, EGPRS, TIA/EIA-136-370 and TIA/EIA-136-370-A standards are collectively referred to herein as the "EDGE standard."

The physical layer dedicated to packet data traffic in the EDGE standard is called the Packet Data Channel (PDCH). The physical layer of the EDGE standard is specified in ETSI standard TS 145.008 (3GPP TS 45.008). Both signaling and traffic channels are transmitted over the PDCH. One of the signaling channels is the Packet Associated Control Channel (PACCH). The traffic channel transmitted over the PDCH is called the Packet Data Traffic Channel (PDTCH).

Unlike basic GSM, several of the higher-speed versions of GSM transmit data at multiple data rates. For example, data is transmitted at nine different data rates over the PDTCH. In a process called "link adaptation," the data rate over the wireless channel is adjusted based on the channel condition. When the channel condition is good and the signal-to-noise ratio of the wireless channel is high, data can be transmitted at higher data rates. Conversely, when the channel condition is poor and the signal-to-noise ratio is low, data must be transmitted at slower data rates. Transmitting data using a particular modulation and coding scheme (MCS) at a data rate that is too high for the channel's signal-to-noise ratio can result in a loss of data. Link adaptation increases overall data throughput by using the highest data rate that can dependably be supported using a particular MCS at the signal-to-noise ratio that momentarily exists on the wireless channel. The EDGE standard requires the mobile station periodically to report the channel condition in the PACCH to the base station. The condition of the channel between the base station and the mobile station is expressed in terms of the bit error probability (BEP). The BEP is the expected value of the actual Bit Error Rate (BER) of a signal received by the mobile station over the wireless channel. The base station then transmits data in the PDTCH to the mobile station at the appropriate data rate depending on the channel condition as indicated in the PACCH.

Link adaptation can most effectively be performed when the mobile station reports a BEP that most accurately estimates the actual BER. One way to estimate the BEP is to attempt to calculate the BER itself. A "re-encoding" method is based on determining the number of bit errors that are corrected in the decoding process. Error control decoding, such as that performed by a convolutional decoder, attempts to correct bit errors that are introduced in the wireless channel. Frames that are output from the block deinterleaver and the convolutional decoder of the mobile station are re-encoded and re-interleaved. The resulting re-encoded bits are then compared to the bits received by the block deinterleaver to determine the number of corrected bit errors. The re-encoding method, however, yields inaccurate results because it relies on the assumption that the error control decoding corrects all of the errors that have been introduced by the wireless channel. Therefore, the BEP obtained using the re-encoding method varies depending on the degree of redundancy employed by the various MCS schemes used to transmit the bits over the wireless channel. Even with a poor channel condition, a high redundancy level of the data allows the error control decoding to decode all of the bits correctly and thus yields a more accurate estimated BER. On the other hand, if the channel condition is poor and redundancy level of the data is low, the error control decoding is unable to correct all of the erroneous bits, and an inaccurate estimate of the BER results. Thus, a better channel quality is required to estimate the BER accurately using a lower redundancy MCS scheme, such as MCS9, than using a higher redundancy MCS scheme, such as MCS5.

FIG. 1 (prior art) compares the estimated BEP obtained using the re-encoding method on data from two channels modulated with different MCSs at different redundancy levels of the data. Less error is introduced by the channel modulated with a higher redundancy code. A curve 10 shows the relationship between the signal-to-noise ratio and the BEP of a channel modulated with Gaussian minimum shift keying (GMSK) at a redundancy level of 1.89. Another curve 11 shows the relationship between the signal-to-noise ratio and the BEP of a channel modulated with GMSK at a redundancy level of 1.0. The re-encoding method indicates that at higher noise levels the BEP of the channel modulated at a redundancy level of 1.0 is lower and thus less accurate than the BEP of the channel modulated at a redundancy level of 1.89. Thus, the estimated BEP at a given signal-to-noise ration is not independent of the redundancy level of the data, as required by the EDGE specification.

FIG. 2 (prior art) compares the BEP obtained using the re-encoding method on data transmitted at three different redundancy levels and modulated with octal phase shift keying (8-PSK). A curve 12 shows the relationship between the signal-to-noise ratio and the BEP for a channel with a redundancy level of 2.70. A curve 13 shows the relationship between the signal-to-noise ratio and the BEP for a channel with a redundancy level of 1.32. A curve 14 shows the relationship between the signal-to-noise ratio and the BEP for a channel with a redundancy level of 1.0. Curves 12-14 show that the re-encoding method inaccurately indicates that the BEP decreases, and the channel condition improves, as the redundancy level decreases.

A second way of estimating the BEP involves first measuring the signal-to-noise ratio of the radio frequency (RF) signal that carries the PDCH. The relationship between the measured signal-to-noise ratio and the BER of the PDCH received by the mobile station is empirically determined in a laboratory. The values of BER that vary as a function of the measured signal-to-noise ratio are then stored in a lookup table on the mobile station. This method requires the mobile station to have an estimator of the signal-to-noise ratio in the RF signal. The BEP is determined by using the estimated signal-to-noise ratio to look up the corresponding BER in the lookup table. The accuracy of the BEP in this method depends on the accuracy of the estimated signal-to-noise ratio of the RF signal. Where the channel condition is affected by signal interference and fading, an accurate determination of the signal-to-noise ratio of the RF signal can be difficult, and the BEP estimation is prone to inaccuracy.

A method is sought for accurately determining the bit error probability (BEP) without requiring a direct estimation of the signal-to-noise ratio of the RF signal and without re-encoding the output of the convolutional decoder of the mobile station. Moreover, a method is sought for determining the BEP that is not influenced by the degree of redundancy in the modulation and coding scheme (MCS) used to transmit the data over the wireless channel.

SUMMARY

A distribution parameter mapping method estimates the bit error probability (BEP) of bits in a burst transmitted in a radio frequency (RF) signal from a base station to a mobile station using one of the nine modulation and coding schemes (MCSs) specified in the EDGE standard. The BEP estimated using the distribution parameter mapping method is not influenced by the degree of code redundancy in the particular MCS used to modulate data over the RF signal. The circuitry determines whether the multi-bit soft decisions that were equalized from demodulated I and Q samples of the burst most resemble a Gaussian distribution or a Rician distribution. The statistical parameters for the mean ($\mu$) and the variance ($\sigma$) are determined for soft decisions having a Gaussian distribution. The statistical parameters A and $\sigma$ are determined for soft decisions having a Rician distribution. The signal-to-noise ratio of the RF signal is represented by the ratio $\mu/\sigma$ for a Gaussian distribution of soft decisions and by the ratio $A/\sigma$ for a Rician distribution of soft decisions. The BEP for a burst having a Gaussian distribution of soft decisions is determined by mapping the ratio $\mu/\sigma$ to an empirically determined BEP in a Gaussian lookup table stored in non-volatile memory on the mobile station. For a Rician distribution, the ratio $A/\sigma$ is mapped to an empirically determined BEP in a Rician lookup table. The estimated BEPs for the four bursts of each radio block are then averaged, filtered and quantized into one of thirty-two levels according to the EDGE standard. The quantization level of the average BEP is then reported to the base station to permit the base station to transmit subsequent radio blocks using an MCS that is appropriate for the estimated BEP of the signal.

Circuitry in a mobile station that performs distribution parameter mapping to estimate the BEP includes an equalizer, a distribution analyzer, a BEP estimator, lookup tables, an averager, a filter and a non-linear quantizer. The equalizer removes intersymbol interference from demodulated I and Q samples received in bursts from a demodulator in the mobile station. For each burst, the equalizer outputs a distribution of multi-bit soft decisions that are subsequently processed by the mobile station into single-bit hard decisions that comprise frames of data. The distribution analyzer receives the distribution of multi-bit soft decisions from the equalizer and determines the type of distribution that the distribution of multi-bit soft decisions resembles. For example, the distribution of multi-bit soft decisions can resemble a Gaussian distribution or a Rician distribution. The distribution analyzer outputs a distribution type identifier.

The BEP estimator receives the distribution of multi-bit soft decisions from the equalizer, as well as the distribution type identifier from the distribution analyzer. The BEP estimator calculates various statistical parameters of the distribution of multi-bit soft decisions, depending on the type of distribution. When the soft decisions have a Gaussian distribution, the BEP estimator calculates the statistical parameters for the mean ($\mu$) and the variance ($\sigma$). When the soft decisions have a Rician distribution, the BEP estimator calculates the statistical parameters A and $\sigma$. The BEP estimator also calculates the ratio $\mu/\sigma$ for a Guassian distribution and the ratio $A/\sigma$ for a Rician distribution. The ratios $\mu/\sigma$ and $A/\sigma$ correlate to the signal-to-noise ratios of the I and Q samples.

The BEP estimator estimates the BEP of a burst containing a Gaussian distribution of multi-bit soft decisions by mapping the ratio $\mu/\sigma$ to an empirically determined BEP in a Guassian lookup table stored on the mobile station. The BEP of a burst containing a Rician distribution of multi-bit soft decisions is estimated by mapping the ratio $A/\sigma$ to an empirically determined BEP in a Rician lookup table stored on the mobile station.

The averager then averages the estimated BEPs from four bursts and generates a MEAN_BEP. The filter filters the MEAN_BEP and outputs a filtered MEAN_BEP. The non-linear quantizer quantizes the filtered MEAN_BEP into one of thirty-two levels and outputs a value (MEAN_BEP_0 through MEAN_BEP_31) that represents the BEP of the four bursts on a logarithmic scale.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is a table listing the data transmission rates of nine MCSs specified in the EDGE standard;

FIG. 6 is a diagram of equations showing the derivation of statistical parameters of Gaussian and Rician distributions used in distribution parameter mapping;

DETAILED DESCRIPTION

Reference will now be made in detail to some embodiments of the invention, examples of which are illustrated in the accompanying drawings.

Figure 1:
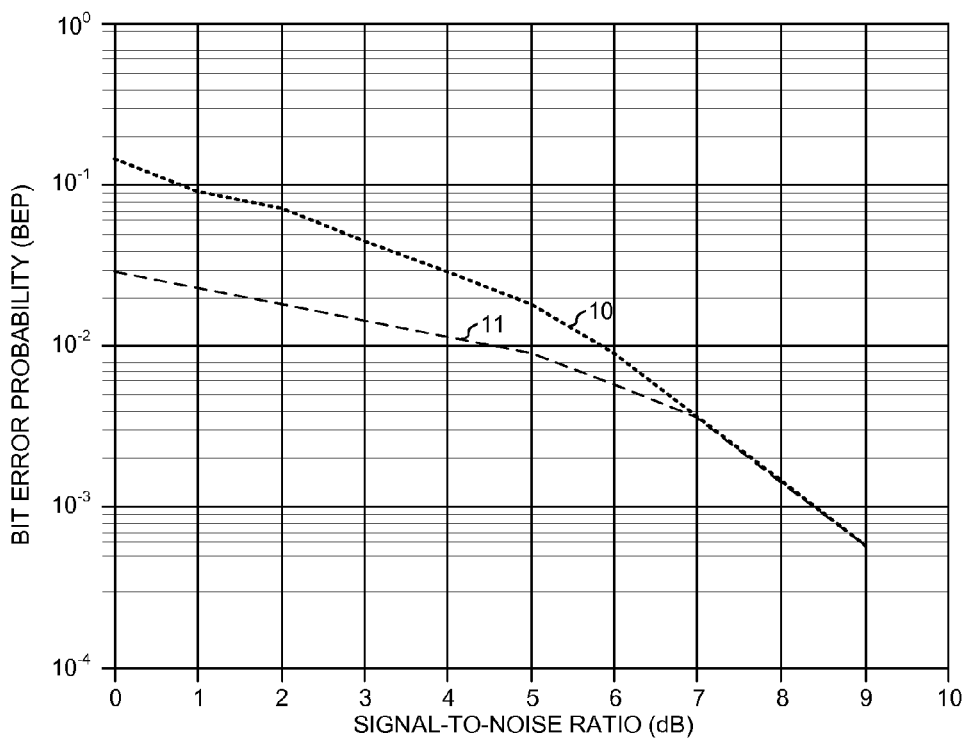
FIG. 1 (prior art) is a diagram plotting bit error probability (BEP) obtained using a re-encoding method at various signal-to-noise ratios of data modulated with two different GMSK modulation and coding schemes (MCSs), each with a different code redundancy level.
Figure 2:
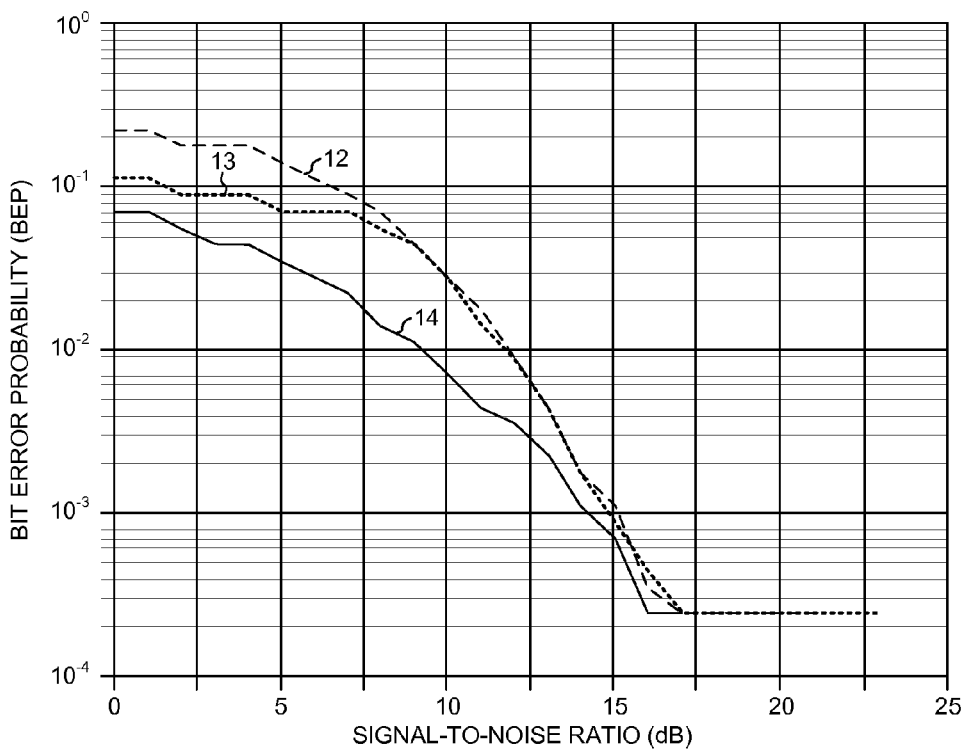
FIG. 2 (prior art) is a diagram plotting BEP obtained using the re-encoding method at various signal-to-noise ratios of data modulated with three different 8-PSK MCSs, each with a different code redundancy level.
Figure 3:
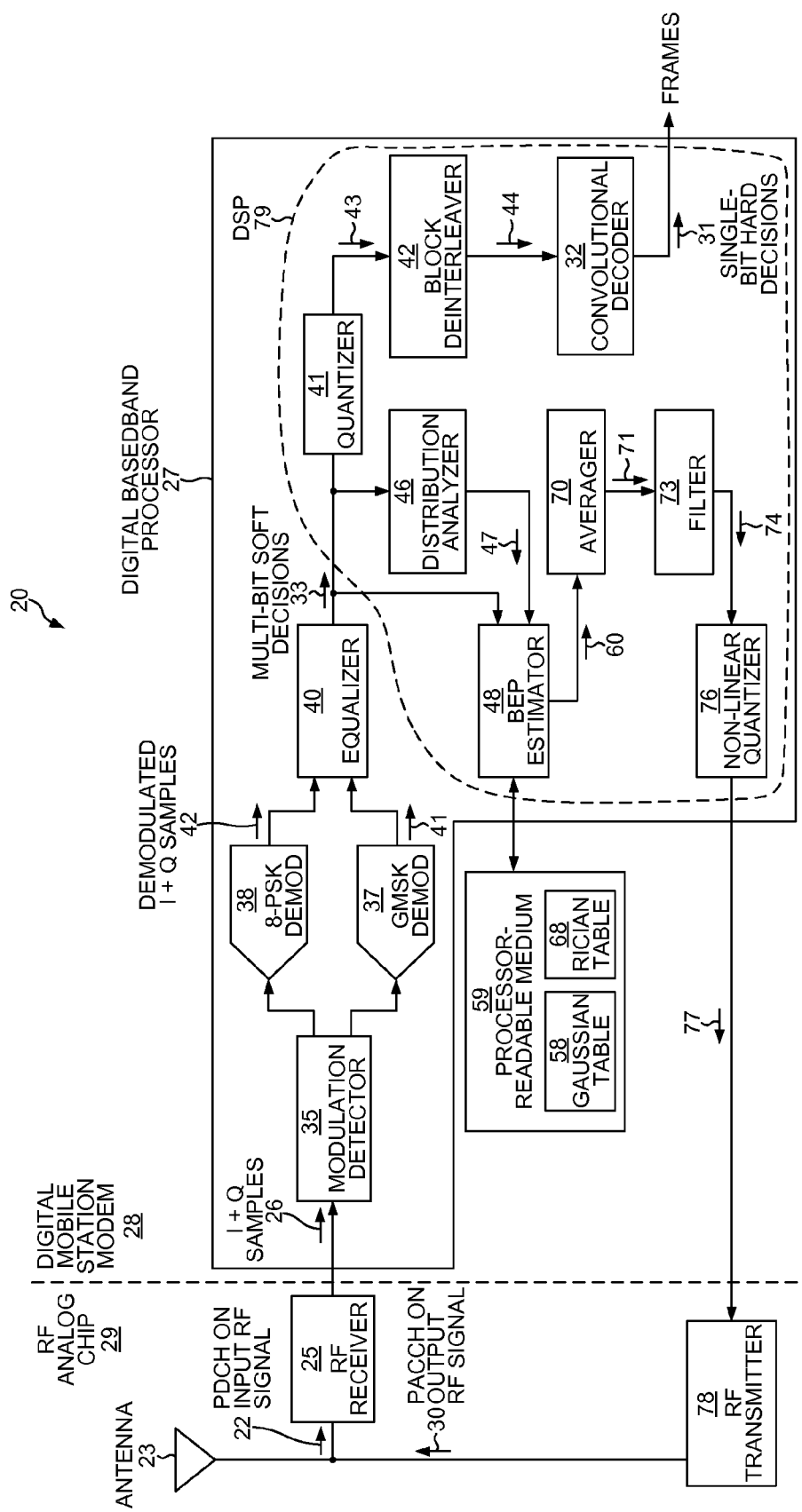
FIG. 3 is a simplified block diagram of circuitry that determines BEP using distribution parameter mapping.

FIG. 3 is a simplified block diagram of circuitry 20 in a mobile station that performs distribution parameter mapping to determine a bit error probability (BEP). The BEP is an estimate of the bit error rate (BER) of a Packet Data Channel (PDCH) transmitted over a radio frequency (RF) signal from a base station to a mobile station using various modulation and coding schemes (MCSs) that conform to the EDGE standard.

Figure 4:
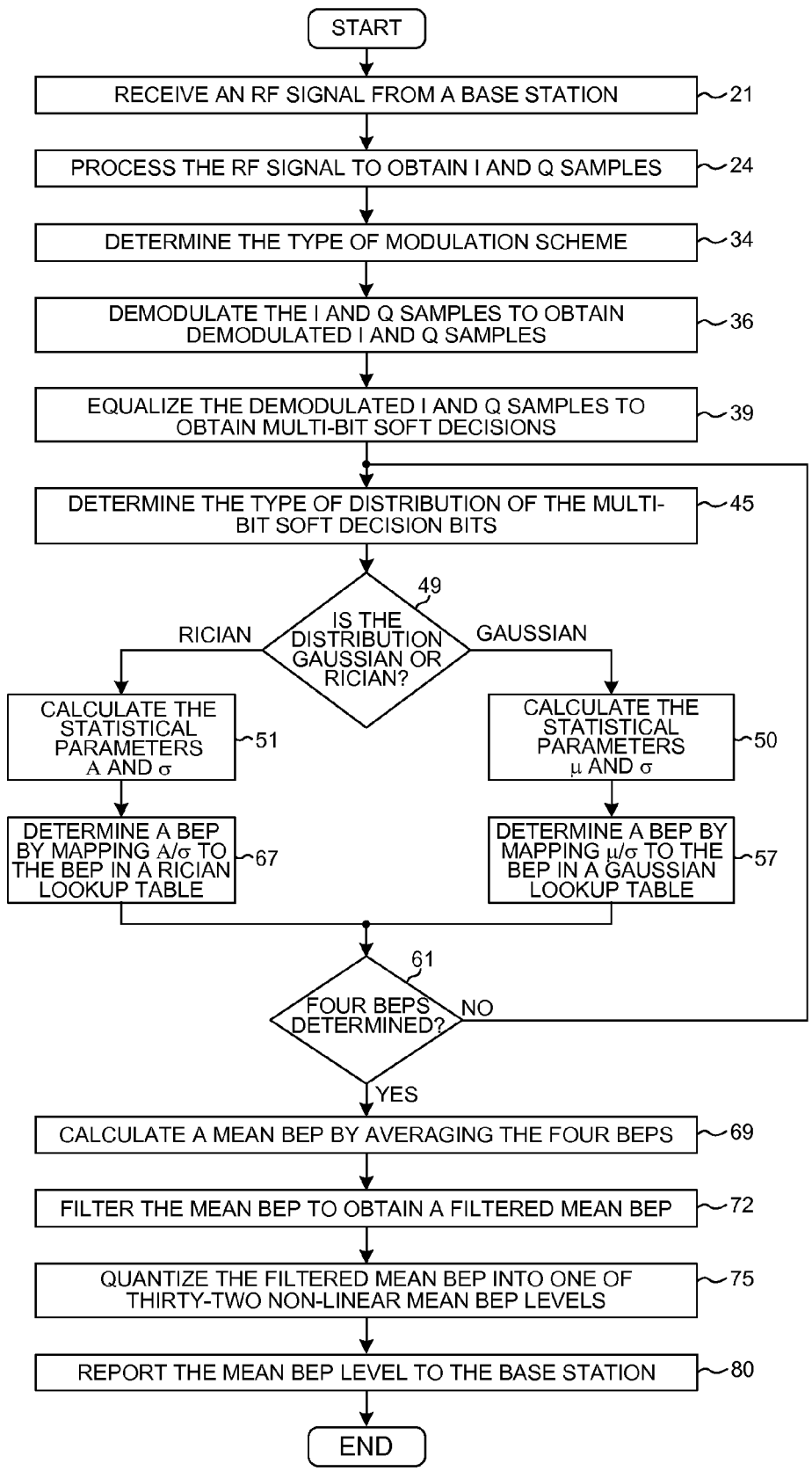
FIG. 4 is a flowchart of steps for performing the distribution parameter mapping employed by the circuitry of FIG. 3.

FIG. 4 is a flowchart showing steps of the by which circuitry 20 uses distribution parameter mapping to determine the BEP. The distribution parameter mapping method is not influenced by the degree of redundancy in the MCS used to modulate data over the RF signal. The operation of individual elements of circuitry 20, as shown in FIG. 3, is explained in detail in connection with the steps listed in FIG. 4. In an initial step 21, an input RF signal 22 is received by an antenna 23 of the mobile station that contains circuitry 20. In a step 24, an RF receiver 25 converts input RF signal 22 to digital in-phase (I) and quadrature (Q) samples 26 for subsequent digital baseband processing. In the embodiment of FIG. 3, the digital baseband layer-1 processing is performed by a digital baseband processor 27. Digital baseband processor 27 is part of a digital mobile station modem 28. RF receiver 25 is incorporated into an RF analog chip 29 that is separate from digital mobile station modem 28.

The BEP determined by circuitry 20 is an indication of the channel condition of the PDCH transmitted over input RF signal 22. The EDGE physical layer specification (ETSI standard TS 145.008; 3GPP standard TS 45.008) provides that the mobile station periodically reports the channel condition of the PDCH to the base station in the Packet Associated Control Channel (PACCH). The base station polls the mobile station for the channel condition. The PACCH is transmitted back to the base station over an output RF signal 30. The mobile station uses the BEP to obtain the channel condition that is reported to the base station. The channel condition is expressed as one of thirty-two BEP levels. The base station then transmits data in the PDTCH over the PDCH back to the mobile station at the appropriate data rate depending on the BEP level indicated in the PACCH.

Depending on the BEP level, data is transmitted at nine different data rates in the EDGE standard. FIG. 5 lists nine MCSs that are associated with the nine data rates. The first four MCSs (MCS1-MCS4) employ the Gaussian minimum shift keying (GMSK) modulation used by basic GSM. The major enhancement to the GSM standard to support higher data rates was the introduction in the EDGE standard of a higher-level modulation technique, known as octal phase shift keying (8-PSK). The highest five MCSs (MCS5-MCS9) use 8-PSK modulation. The EDGE standard describes a narrowband system that uses a combination of frequency division multiple access (FDMA) and time division multiple access (TDMA). The frequency band that is allocated to EDGE transmissions is first divided into various 200-kHz carrier signals. FIG. 5 lists the data rates achievable with the listed modulation and coding schemes when using a single 200-kHz carrier and one timeslot. The data rates can be increased by simultaneously using multiple 200-kHz carriers, for example, six carriers. The carrier signals are then modulated and transmitted over an RF signal, such as input RF signal 22 and output RF signal 30. Each carrier signal is divided into eight timeslots. The data rates can be further increased by using multiple timeslots, for example, all eight timeslots. EDGE provides for the transmission of packet-switched data. Each packet is composed of frames and includes a data message and control information. Each frame in turn is transmitted as a burst during an appropriate timeslot. The frames are transmitted over the carrier signal in radio blocks. Each radio block is four frames transmitted as a sequence of four bursts. Each burst is 4.615 ms, and each radio block is 20 ms.

The first four MCSs have different coding schemes that provide for nearly no coding (MSC4) to highly redundant coding (MSC1). The code rate listed in FIG. 5 is the inverse of the code redundancy. A higher code redundancy allows data to be recognized despite channel fading, but results in a lower data rate. For example, MSC1 has a data rate of 9.05 kbps per channel, and MSC4 has a data rate of 21.4 kbps per channel. By dynamically decreasing code redundancy during periods of lower fading and noise, a higher network performance can be achieved. Adapting the code redundancy and modulation technique to maximize throughput depending on the channel condition is called "Link Adaptation."

The highest five MCSs support higher data rates because 8-PSK signals are able to carry three bits per modulated symbol instead of one bit per symbol with GMSK modulation. Thus, the data rates of the MCSs employing 8-PSK are approximately three times as fast. Signal propagation using 8-PSK is diminished, however, in comparison to GMSK. The coverage area achieved with signals employing the higher data rates of 8-PSK modulation is therefore smaller.

In one mode of link adaptation, the mobile station reports the BEP level based on the mean BEP for each of the eight timeslots in a temporary block flow (TBF). The method of FIG. 4 describes determining a BEP level based on the mean BEP for a particular timeslot. In a second mode of link adaptation, the mobile station reports the BEP level based on the mean BEP for the modulation for which the mobile station has received the largest number of radio blocks since the previous message. The BEP level is based on the mean and the coefficient of variation of the BEP measurements for the primary modulation averaged over all of the timeslots in the TBF. The EDGE standard provides that a single MCS is used for all the timeslots allocated to a carrier of a TBF based on the collective channel condition measurements for all of the timeslots.

Digital baseband processor 27 receives the I and Q samples 26 from the RF receiver 25 and outputs frames containing single-bit hard decisions 31. The single-bit hard decisions 31 are output by a convolutional decoder 32, such as a Viterbi decoder. The frames are processed as data or are analyzed as speech in a voice decoder. Circuitry 20 estimates the signal-to-noise ratio of the PDCH transmitted over input RF signal 22 without re-encoding the output of convolutional decoder 32. Circuitry 20 instead analyzes multi-bit soft decisions 33 that are generated as part of the digital baseband layer-1 processing to estimate the signal-to-noise ratio of the PDCH.

In a step 34, a modulation detector 35 receives the I and Q samples 26 from RF receiver 25 and determines the type of modulation scheme by which data was modulated over the carrier signal on input RF signal 22. According to the EDGE standard, the modulation scheme is either GMSK or 8-PSK. A detection algorithm is used to differentiate I and Q samples modulated with either GMSK or 8-PSK based on the different phase characteristics of the GMSK and 8-PSK modulations. One detection method, for example, first assumes that the data is modulated with GMSK and then performs a π-by-4 rotation. A signal-to-noise ratio is then estimated for this GMSK hypothesis. A rotation is then performed assuming that the data is modulated with 8-PSK, and the signal-to-noise ratio is again estimated. The method determines that the modulation scheme corresponds to the modulation hypothesis for which the signal-to-noise ratio was the greatest.

In a step 36, the I and Q samples 26 are then demodulated. Depending on the modulation scheme identified in step 34, the I and Q samples 26 are demodulated by either a GMSK demodulator 37 or an 8-PSK demodulator 38. A GMSK demodulator 37 demodulates I and Q samples 26 that were modulated with MCS1 through MCS4, which employ GMSK. An 8-PSK demodulator 38 demodulates I and Q samples 26 that were modulated with MCS5 through MCS9, which employ 8-PSK. In the embodiment of FIG. 3, GMSK demodulator 37 and 8-PSK demodulator 38 are dedicated hardware within digital baseband processor 27. In other embodiments, the GMSK and 8-PSK demodulation performed by GMSK demodulator 37 and 8-PSK demodulator 38 is performed by a digital signal processor or a microcontroller that are part of digital baseband processor 27.

The demodulated I and Q samples 41 output by GMSK demodulator 37 and the demodulated I and Q samples 42 output by 8-PSK demodulator 38 constitute symbols in baseband. Depending on the modulation scheme, a demodulated sample can have various number of bits, for example, 1, 2 or 10. The demodulated samples represent positive and negative numbers in GMSK and real and imaginary numbers in 8-PSK. There are one in-phase sample and one quadrature sample per symbol bit. In GMSK, there are 116 symbols in each of the four bursts of a radio block. In 8-PSK, there are 348 symbols (3×116) per burst.

In a step 39, an equalizer 40 equalizes demodulated I and Q samples 41 and 42 and outputs the multi-bit soft decisions 33. Thus, each I and Q sample bit is assigned a multi-bit soft decision value. The multi-bit soft decisions 33 constitute symbols for which inter-symbol interference has been removed. Inter-symbol interference results when one symbol is temporally modulated on top of another symbol. In one example, each of the multi-bit soft decisions 33 is a 16-bit 2's complement signed digital value.

Circuitry 20 estimates the BEP based on the multi-bit soft decisions 33. The multi-bit soft decisions 33 are also further processed by digital baseband processor 27 to obtain the single-bit hard decisions 31 that are included in the frames that contain voice and data information. A quantizer 41 quantizes the multi-bit soft decisions 33 into a lesser number of levels than the number of digital states available from the number of bits of the multi-bit soft decisions 33. A block deinterleaver 42 receives quantized symbols 43 from quantizer 41 and output deinterleaved symbols 44. The convolutional decoder 32 than decodes the deinterleaved symbols 44 and outputs the single-bit hard decisions 31.

Returning to the distribution parameter mapping method of estimating the BEP, circuitry 20 next determines the type of statistical distribution of the multi-bit soft decisions 33. In a step 45, a distribution analyzer 46 determines the type of statistical distribution to which the soft decisions 33 of each burst correspond. Distribution analyzer 46 then outputs a corresponding distribution type identifier 47. For example, the distribution of the values of the multi-bit soft decisions 33 may resemble one of the following distribution types: a Gaussian distribution, a Rice (Rician) distribution, a Rayleigh distribution, a Poisson distribution or a Laplace distribution. The distribution of the multi-bit soft decisions 33 typically resembles either a Gaussian or a Rician distribution. In a static channel where the signal-to-noise ratio is not significantly improving or deteriorating, the distribution of the multi-bit soft decisions 33 typically resembles a Gaussian distribution. On the other hand, if there is a line of sight path between the base station and the mobile station, the wireless channel is usually described by the Rician fading model, and the distribution of the multi-bit soft decisions 33 typically resembles a Rician distribution. Distribution analyzer 46 uses well-known algorithms to determine the statistical distribution type that the distribution of the multi-bit soft decisions 33 most closely resembles. For example, the type of distribution can be recognized by the maximum value of the distribution, the location of the maximum value within the distribution, and the spread of the distribution.

A BEP estimator 48 receives the soft decisions 33 for each burst that are output by equalizer 40. In addition, BEP estimator 47 receives distribution type identifier 47. In a decision step 49, BEP estimator 48 determines which statistical parameters to calculate. If the distribution type identifier 47 indicates that the soft decisions 33 resemble a Gaussian distribution, BEP estimator 48 proceeds to a step 50 and calculates the statistical parameters $\mu$ (mu) and $\sigma$ (sigma). If the distribution type identifier 47 indicates that the soft decisions 33 resemble a Rician distribution, BEP estimator 48 proceeds to a step 51 and calculates the statistical parameters A and $\sigma$.

In the following example of step 50, the statistical parameters $\mu$ and $\sigma$ are calculated from soft decisions whose distribution is found to resemble a Gaussian distribution in decision step 49. Thus, the distribution of the soft decisions resembles the Gaussian probability density function (PDF) 52 shown in FIG. 6. In Gaussian PDF 52, $\mu$ represents the mean, and $\sigma$ represents the variance of the distribution p(x). In this example, each of the multi-bit soft decisions 33 output by equalizer 40 is a 4-bit 2's complement signed digital value. There are 116 soft decisions in one burst because the soft decisions 33 were equalized from I and Q samples modulated with GMSK. The 116 values are as follows: 15×[1100]; 30×

[1101]; 15×[1110]; 15×[0000]; 30×[0001]; 11×[0010], where [1100]=−4; [1101]=−3; [1110]=−2; [0000]=0; [0001]=1; and [0010]=2. The statistical parameters μ and σ are calculated by first determining the second and fourth moments of the Gaussian DPF for the sample distribution. The second moment is defined as the sum of the each element squared, divided by the number of elements in the distribution. The fourth moment is defined as the sum of the each element to the fourth power, divided by the number of elements in the distribution. For the sample distribution of 116 soft decisions listed above, the second moment is 5.552, and the fourth moment is 57.897. The second and fourth moments can also be expressed in terms of the mean (μ) and the variance (σ).

FIG. 6 shows an equation 53 for the second moment and an equation 54 for the fourth moment, each expressed in terms of μ and σ. The mean (μ) and the variance (σ) are determined by solving these two equations in two variables. An equation 55 expresses μ in terms of the second and fourth moments. An equation 56 expresses σ in terms of the second and fourth moments. For the sample distribution of 116 soft decisions listed above, μ is determined to be 2.039, and σ is determined to be 1.181.

Returning to the next step in FIG. 4, the BEP is determined in a step 57 by mapping the quotient μ/σ to a BEP value in a lookup table. The quotient of the mean (μ) divided by the variance (σ) is indicative of the signal-to-noise ratio of the data that comprise a distribution. For the sample Gaussian distribution, the quotient μ/σ is 1.727. The relationship between the quotient μ/σ and the BER for channels whose data resembles a Gaussian distribution is empirically determined in a laboratory. The results are then stored in a Gaussian lookup table 58 in a processor-readable medium 59, as shown in FIG. 3. The lookup table is then used to estimate the BEP based on the signal-to-noise ratio estimated by the quotient μ/σ. BEP estimator 48 determines a BEP value 60 for each distribution of multi-bit soft decisions 33 of a burst. For the signal-to-noise ratio of 1.727 of the sample Gaussian distribution, BEP value 60 is determined to be 0.050.

In a decision step 61, circuitry 20 determines whether the BEP value 60 of each of the four bursts in the radio block has been determined If four BEP values have not yet been determined, BEP estimator 48 determines the BEP for the next distribution of 116 soft decisions on the next GMSK burst. Where the burst has been modulated with 8-PSK, BEP estimator 48 determines the BEP for a distribution comprising 348 soft decisions per burst.

Returning to step 51, the statistical parameters A and σ are calculated from the sample distribution of soft decisions listed above assuming that the distribution is found to resemble a Rician distribution in decision step 49. Thus, in this example, the sample distribution is found to resemble the Rician probability density function (PDF) 62 shown in FIG. 6. The statistical parameters A and σ are calculated by first determining the second and fourth moments of the Rician DPF for the sample distribution. The values of the second and fourth moments of a distribution do not change when the distribution is characterized as resembling a different type of distribution. Therefore, the values of the second and fourth moments of the Rician distribution are the same as calculated above for the Gaussian distribution.

FIG. 6 shows an equation 63 for the second moment and an equation 64 for the fourth moment, each expressed in terms of A and σ. These two equations in two variables are then solved to obtain an equation 65 expressing A in terms of the second and fourth moments. In addition, an equation 66 expresses σ in terms of the second and fourth moments. Assuming that the sample distribution of 116 soft decisions listed above resembles a Rician distribution, A is determined to be 1.391, and σ is determined to be 1.345.

In a step 67, the BEP is then determined by mapping the quotient A/σ to a BEP value in a lookup table. For the sample Rician distribution, the quotient A/σ is 1.035. The relationship between the quotient A/σ and the BER for channels whose data resembles a Rician distribution is also empirically determined in a laboratory. The results of the empirical determination are then stored in a Rician lookup table 68 in processor-readable medium 59. Rician lookup table 68 is then used to estimate the BEP based on the quotient A/σ. Where the quotient A/σ of the sample Rician distribution equals 1.035 in this example, BEP value 60 is determined to be 0.079.

In a step 69, an averager 70 calculates the average of four BEP values 60 when circuitry 20 determines in decision step 61 that the BEP of each of the four bursts in a radio block has been determined Averager 70 outputs a signal MEAN_BEP 71 that represents the average of the four BEP values 60.

In a step 72, a filter 73 receives and filters the MEAN_BEP 71. Filter 73 is a digital low pass filter, such as an infinite impulse response (IIR) filter. Filter 73 outputs a filtered MEAN BEP 74.

In a step 75, a non-linear quantizer 76 quantizes the filtered MEAN_BEP 74 into one of thirty-two non-linear levels or intervals. Non-linear quanitizer 76 outputs one of thirty-two values MEAN_BEP_O through MEAN_BEP_31 (77) that represents the average, filtered BEP on a logarithmic scale. The quantized MEAN_BEP 77 is then received by an RF transmitter 78 on RF analog chip 29. In one embodiment, most of the circuitry of digital baseband processor 27 is part of a digital signal processor (DSP) 79, including distribution analyzer 46, BEP estimator 48, averager 70, filter 73 and non-linear quantizer 76.

In a step 80, the quantized MEAN_BEP 77 (MEAN_BEP_0-MEAN_BEP_31) of the level of the average BEP is transmitted back to the base station in PACCH over output RF signal 30. The base station then transmits subsequent radio blocks using an MCS that is chosen based on the quantized MEAN_BEP 77. For example, the base station chooses the MCS with the fastest data rate that can be supported under the channel condition described by the quantized MEAN_BEP 77.

Figure 7:
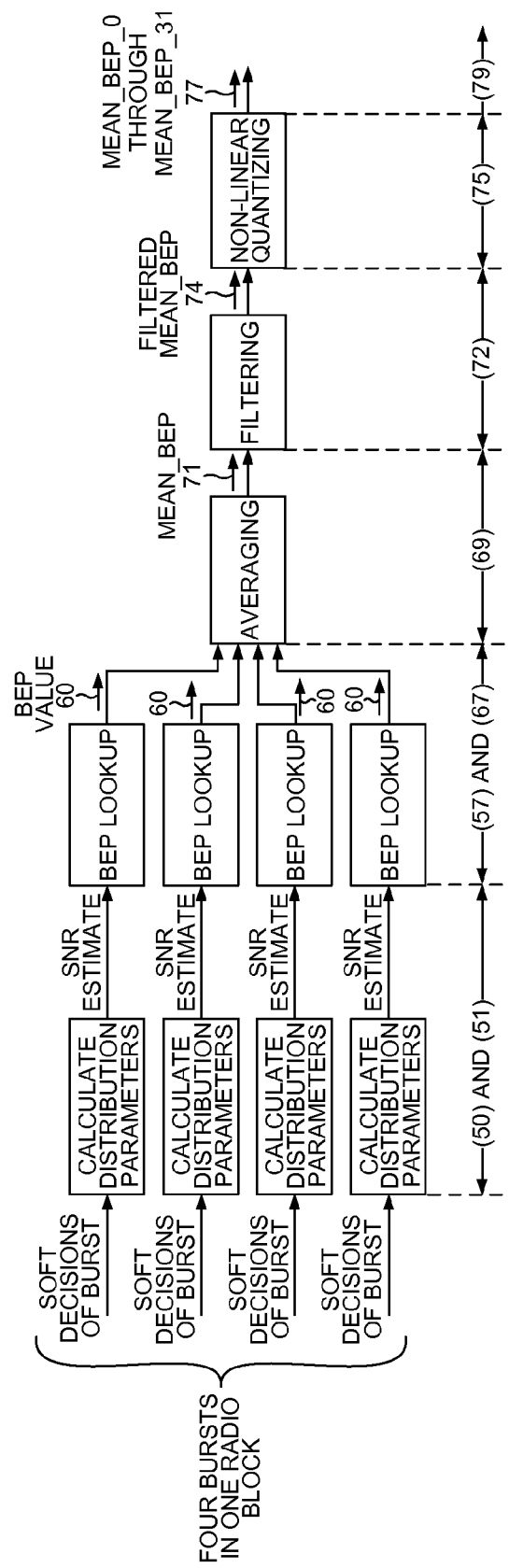
FIG. 7 is a flowchart illustrating certain steps of the distribution parameter mapping method of FIG. 4 used to obtain a quantized, filtered, average BEP for four bursts of a radio block.

FIG. 7 is a flowchart illustrating the various steps performed by circuitry 20 to obtain the quantized MEAN_BEP 77 for a radio block. FIG. 7 shows that the steps 50 and 57 (for GMSK) and the steps 51 and 67 (for 8-PSK) are performed for each of four bursts of a radio block, whereas the steps 69 (averaging), 72 (filtering) and 75 (quantizing) are performed only once per radio block.

Figure 8:
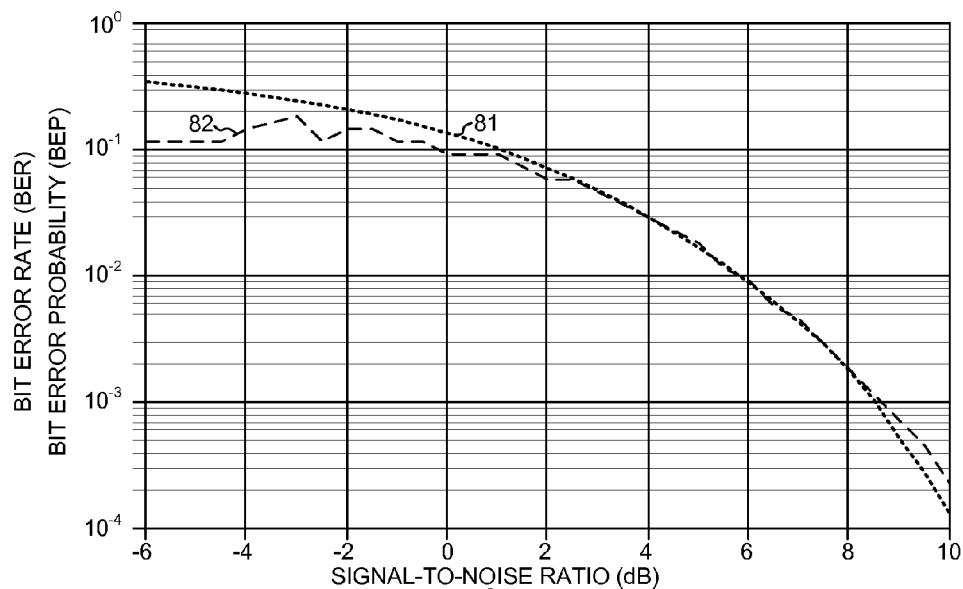
FIG. 8 is a diagram plotting BEP at various signal-to-noise ratios obtained using distribution parameter mapping for a static channel modulated with MCS4 (a GMSK scheme)

FIG. 8 shows the results of using distribution parameter mapping to determine BEP values for a channel modulated with MCS4 at signal-to-noise ratios ranging from −6 dB to 10 dB. The BEP values are estimated from bursts transmitted over a static channel with a constant signal strength exhibiting no fading. Thus, the distribution of the multi-bit soft decisions 33 used to derive the BEP values resembles a Gaussian distribution. The BEP values are obtained using the method of FIG. 4 through step 50, and the BEP values 60 are determined by mapping the ratio μ/σ to BEP values in the Gaussian lookup table 58. A curve 81 shows the actual bit error rate (BER) of the channel over the range of signal-to-noise ratios from −6 dB to 10 dB. The actual BER is determined by transmitting a known bit sequence over thousands of radio blocks and comparing the bits from the demodulated I and Q samples to the known bit sequence. A curve 82 shows the estimated BEP value 60 obtained at each signal-to-noise ratio using distribution parameter mapping. The estimated BEP value 60 plotted in FIG. 8 for each signal-to-noise ratio is the BEP value that resulted the most number of times from among the thousands of bursts over which the known bit sequence was transmitted.

Figure 9:
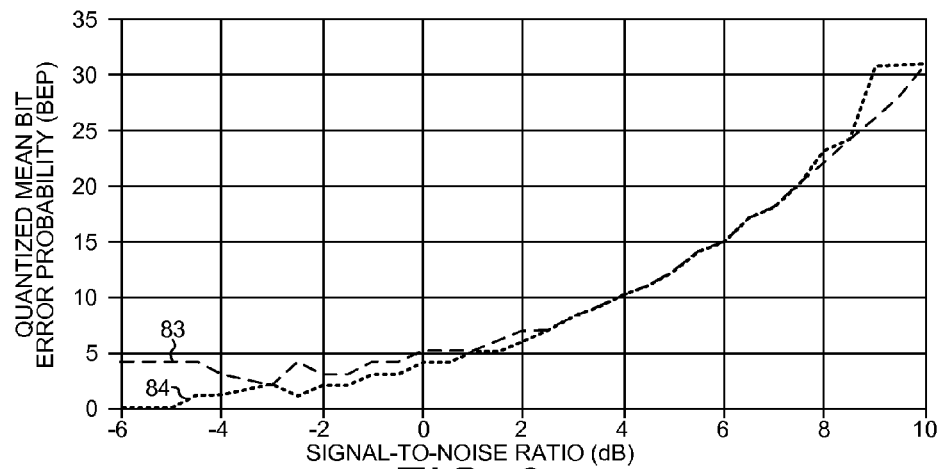
FIG. 9 is a diagram plotting quantized, average BEP at various signal-to-noise ratios obtained from groups of four consecutive BEP values of FIG. 8.

FIG. 9 shows the values of the quantized MEAN_BEP 77 obtained from groups of four consecutive BEP values 60 of FIG. 8. At lower signal-to-noise ratios, the quantized MEAN_BEP 77 is assigned a value closer to zero. At higher signal-to-noise ratios, the quantized MEAN_BEP 77 is assigned a value closer to thirty-two. A curve 83 shows the estimated, quantized average BEP values obtained using distribution parameter mapping. A curve 84 shows the values of the quantization levels that would be output using demodulated I and Q samples that exhibit the actual BER.

Figure 10:
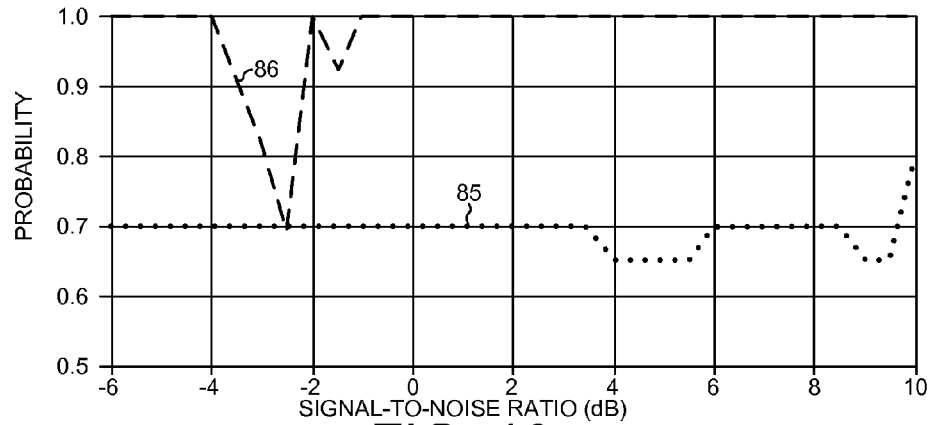
FIG. 10 is a diagram of the probability at various signal-to-noise ratios that the quantized, average BEP of FIG. 9 falls within a correct quantization level.

FIG. 10 shows the probability, at signal-to-noise ratios from −6 dB to 10 dB, that the MEAN_BEP value 71 will be correctly determined and reported to the base station as the correct quantization level. The EDGE standard specifies how to test the circuitry that generates the values of the quantization levels. The test requires that a certain percentage of the quantized MEAN_BEP values 77 reported by the mobile station fall within a narrow range of correct quantization levels, for example, three quantization levels. For example, at a signal-to-noise ratio of 5 dB, at least 65% of the quantized MEAN_BEP values 77 must fall within one of the quantization levels MEAN_BEP_11, MEAN_BEP_12 and MEAN_BEP_13 in order to pass the test. A dotted curve 85 shows the minimum probability of achieving an acceptable quantization level when estimating the BEP of a channel modulated with MCS1 through MCS4 (GMSK) in order to comply with the EDGE standard. A curve 86 shows the probability that a quantized MEAN_BEP 77 obtained using distribution parameter mapping falls within an acceptable quantization level.

Figure 11:
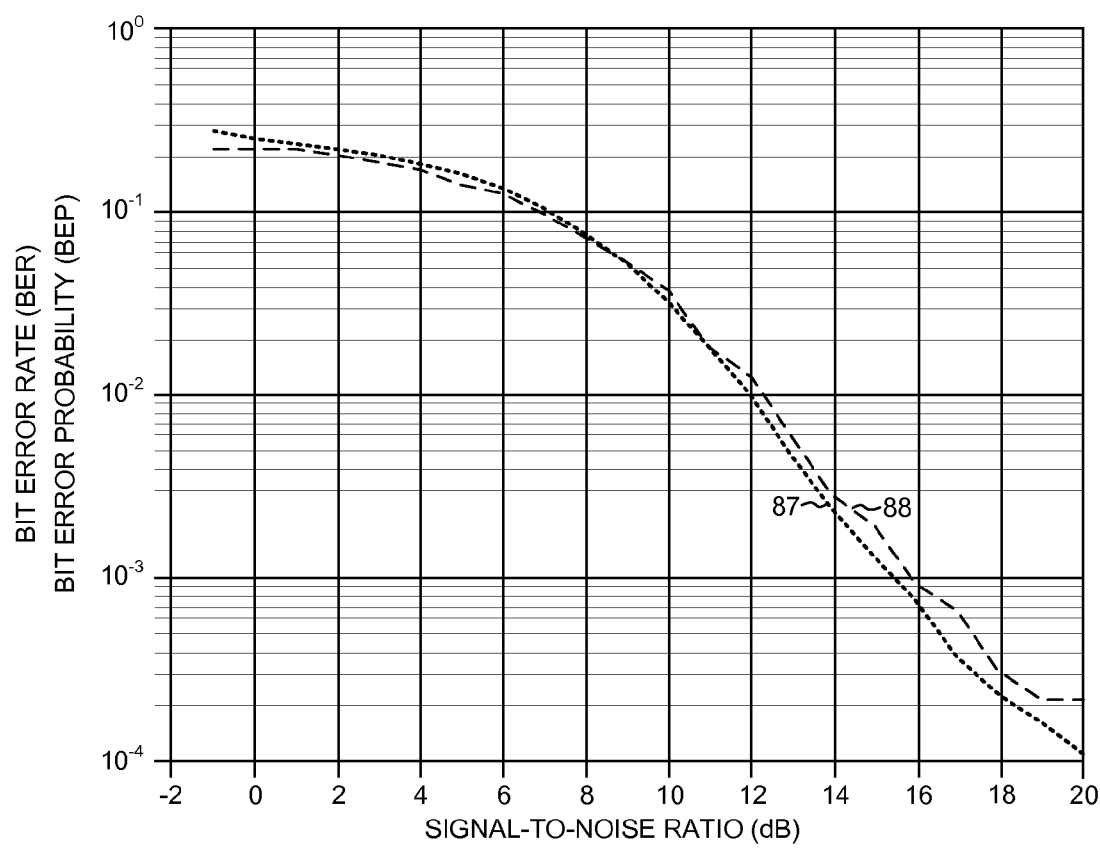
FIG. 11 is a diagram plotting BEP at various signal-to-noise ratios obtained using distribution parameter mapping for a static channel modulated with MCS9 (an 8-PSK scheme)

FIG. 11 shows the results of using distribution parameter mapping to determine BEP values obtained from a channel modulated with MCS9 employing 8-PSK. The BEP values are estimated from bursts transmitted over a static channel exhibiting no fading. As in FIG. 8, the BEP values 60 are determined by mapping the ratio μ/σ to BEP values in the Gaussian lookup table 58. A curve 87 shows the actual BER of the channel over a range of signal-to-noise ratios from −1 dB to 20 dB. A curve 88 shows the BEP value 60 obtained at each signal-to-noise ratio using distribution parameter mapping. The estimated BEP values 60 plotted in FIG. 11 for each signal-to-noise ratio is the BEP value obtained the most number of times from the thousands of bursts over which the known bit sequence was transmitted.

Figure 12:
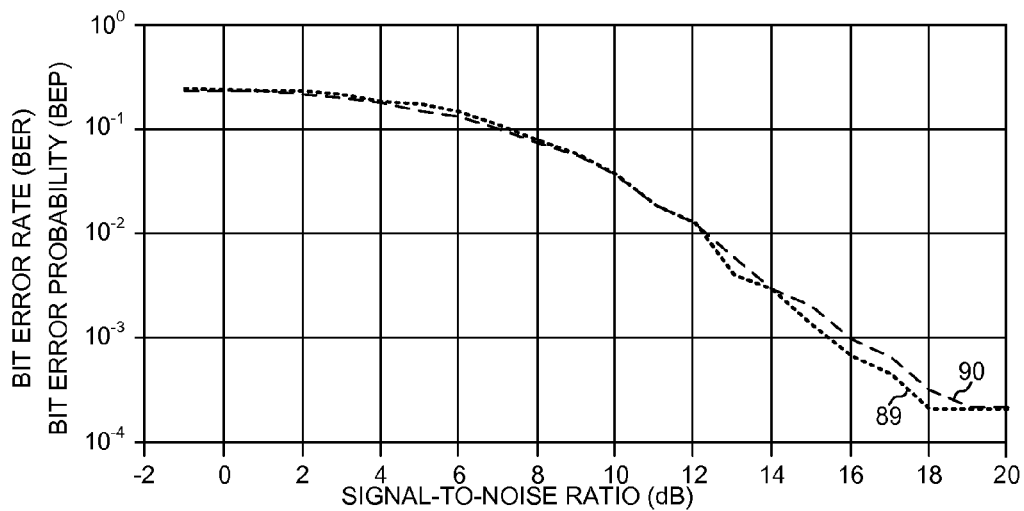
FIG. 12 is a diagram plotting BEP values at various signal-to-noise ratios obtained using distribution parameter mapping for a static channel modulated with MCS9, wherein the BEP values represent an average of several BEP values that were most prevalent among the many bursts over which BEP values were estimated at each signal-to-noise ratio.

FIG. 12 shows BEP values obtained from a channel modulated with MCS9 over the same signal-to-noise ratio as in FIG. 11. The BEP values and the values of the actual BER, however, fluctuate over different bursts at each signal-to-noise ratio. The BEP values and the values of the actual BER plotted in FIG. 12 represent an average of the three BEP or BER values that were most prevalent in the multiple bursts over which the known bit sequence was transmitted at a particular signal-to-noise ratio. A curve 89 shows the actual BER at each signal-to-noise ratio from −1 dB to 20 dB. A curve 90 shows the BEP value obtained at each signal-to-noise ratio using distribution parameter mapping.

Figure 13:
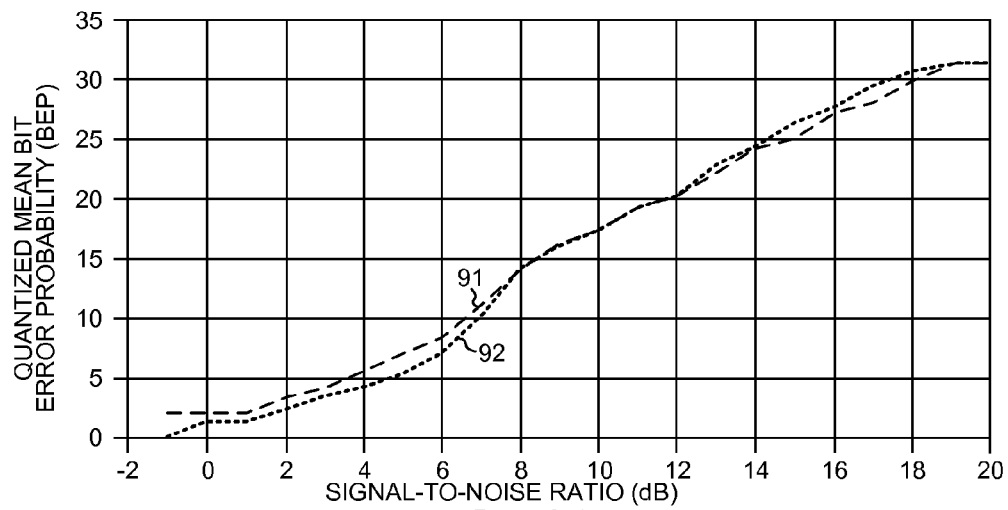
FIG. 13 is a diagram plotting quantized, average BEP at various signal-to-noise ratios obtained from groups of four consecutive BEP values of FIG. 11.

FIG. 13 shows the values of the quantized MEAN BEP 77 obtained from the BEP values 60 of FIG. 11. The values of the quantized MEAN_BEP 77 range from zero to thirty-two. A curve 91 shows the estimated, quantized average BEP values obtained using distribution parameter mapping. A curve 92 shows the quantization levels obtained from the values of the actual BER.

Figure 14:
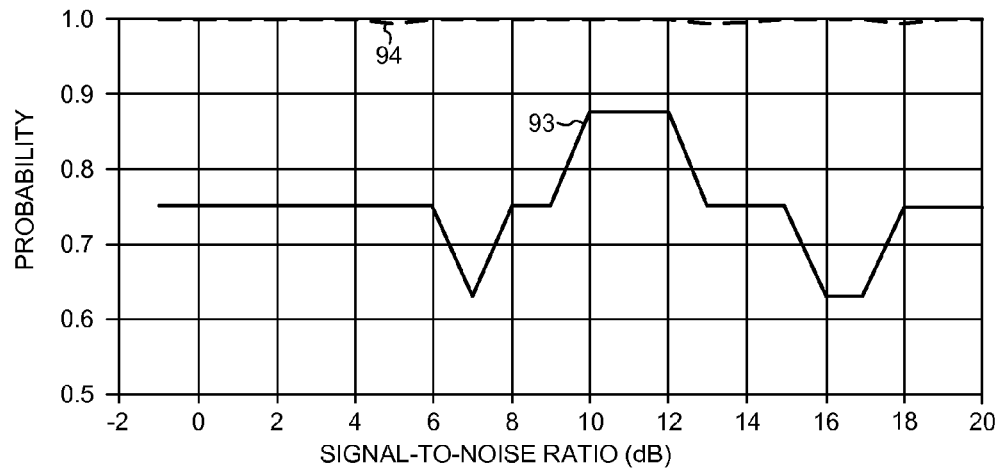
FIG. 14 is a diagram of the probability at various signal-to-noise ratios that the quantized, average BEP of FIG. 13 falls within a correct quantization level.

FIG. 14 shows the probability at signal-to-noise ratios from −1 dB to 20 dB that the MEAN_BEP value 71 will be correctly determined from a channel and reported to the base station as a correct quantization level. A dotted curve 93 shows the minimum probability that must be achieved at each signal-to-noise ratio to comply with the EDGE standard. Dotted curve 93 applies to quantization levels obtained from average BEP values from channels modulated with MCS5 through MCS9 (8-PSK). A curve 94 shows the probability that a quantized MEAN_BEP 77 obtained using distribution parameter mapping is at the correct quantization level using the test specified in the EDGE standard.

Figure 15:
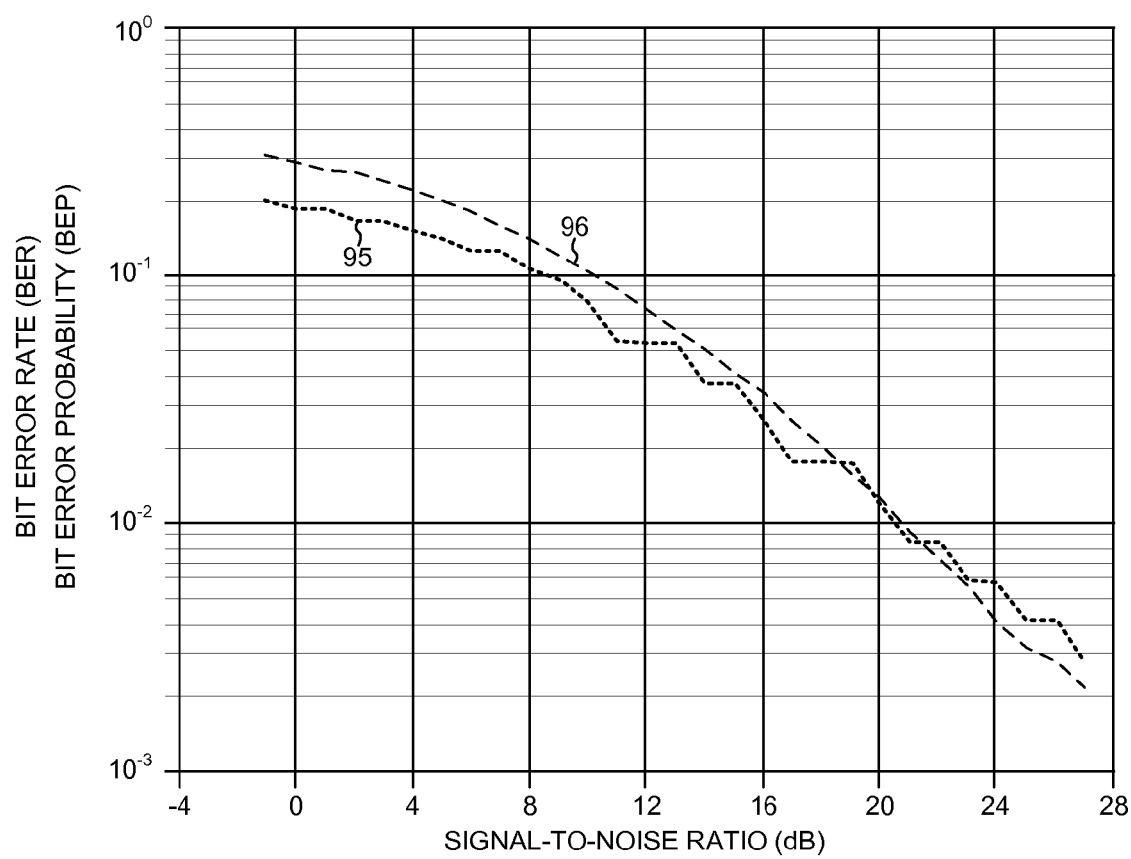
FIG. 15 is a diagram plotting BEP at various signal-to-noise ratios obtained using distribution parameter mapping for a fading channel modulated with MCS9.

FIG. 15 shows the results of using distribution parameter mapping to determine BEP values obtained from a channel modulated with MCS9. Unlike the results shown in FIG. 11, the BEP values in FIG. 15 are estimated from bursts transmitted over a fading channel. The channel analyzed in FIG. 15 is a TU50 channel, which is a channel in a typical urban environment where the mobile station is moving at 50 km/hr. Thus, the distribution of the multi-bit soft decisions 33 used to derive the BEP values resembles a Rician distribution. The BEP values are obtained using the method of FIG. 4 through step 51, and the BEP values 60 are determined by mapping the ratio A/σ to BEP values in the Rician lookup table 68. A curve 95 shows the actual BER of the channel over a range of signal-to-noise ratios from −1 dB to 27 dB. A curve 96 shows the BEP value 60 obtained at each signal-to-noise ratio using distribution parameter mapping. At signal-to-noise ratios above about 7 dB, the BER of the fading channel in FIG. 15 is greater than the BER of the static channel in FIG. 11, where both channels are modulated using MCS9. The estimated BEP values 60 plotted in FIG. 15 for each signal-to-noise ratio is the BEP value obtained the most number of times from the thousands of bursts over which the known bit sequence was transmitted.

Although the present invention has been described in connection with certain specific embodiments for instructional purposes, the present invention is not limited thereto. Most of the circuitry of digital baseband processor 27 is described above as being part of DSP 79. In other embodiments, some components of circuitry 20 are implemented as sets of instructions operating on a processor separate from DSP 79. For example, the separate processor can be an ARM processor. The instructions are stored on processor-readable medium 59, and the separate processor reads the instructions from processor-readable medium 59 before performing the instructions. Thus, processor-readable medium 59 stores not only Gaussian lookup table 58 and Rician lookup table 68, but also program instructions. In this case, processor-readable medium 59 is a type of non-volatile memory, such as read only memory (ROM). In one embodiment, for example, each of equalizer 40, distribution analyzer 46, BEP estimator 48, averager 70, filter 73 and non-linear quantizer 76 is implemented as a set of instructions operating on the separate processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Accordingly, the present invention is not intended to be limited to the embodiments shown herein but is to be accorded the widest scope consistent with the principles and novel features disclosed herein.

What is claimed is:

1. A method for estimating a bit error probability (BEP), comprising:
   equalizing demodulated I and Q samples to obtain a plurality of multi-bit soft decisions, wherein the demodulated I and Q samples exhibit the BEP and the plurality of multi-bit soft decisions include a distribution with a mean and a variance;
   determining a type of the distribution based on a maximum value of the distribution, a location of the maximum value within the distribution and a spread of the distribution and wherein the distribution is a soft decision distribution computed directly without further processing from the equalized demodulated I and Q samples;
   calculating the mean and variance of the distribution; and
   estimating the BEP based on the mean and the variance of the distribution.

2. The method of claim 1, wherein calculating the mean and the variance is performed based on the type of the distribution, and wherein the type of the distribution is either a Gaussian distribution or a Rician distribution.

3. The method of claim 1, further comprising deinterleaving the plurality of multi-bit soft decisions.

4. The method of claim 3, wherein the plurality of multi-bit soft decisions comprise symbols each with three bits.

5. The method of claim 3, further comprising convolutionally decoding the deinterleaved plurality of multi-bit soft decisions to obtain at least one single-bit hard decision.

6. The method of claim 5, wherein the plurality of single-bit hard decisions comprise at least one frame of data.

7. The method of claim 1, wherein the estimating the BEP comprises finding the BEP in a lookup table and using a ratio equaling the mean divided by the variance.

8. The method of claim 1, further comprising demodulating I and Q samples by using a demodulation scheme of either Gaussian minimum shift keying (GMSK) or octal phase shift keying (8-PSK) to obtain the demodulated I and Q samples.

9. The method of claim 1, further comprising determining a mean BEP by averaging a plurality of bit error probabilities comprising the BEP.

10. The method of claim 9, further comprising:
    filtering the mean BEP; and
    quantizing the filtered mean BEP for transmission.

11. An apparatus for estimating a bit error probability (BEP), comprising:
    an equalizer for equalizing demodulated I and Q samples to obtain a plurality of multi-bit soft decisions, wherein the demodulated I and Q samples exhibit the BEP and the plurality of multi-bit soft decisions include a distribution with a mean and a variance;
    a distribution analyzer for determining a type of the distribution based on a maximum value of the distribution, a location of the maximum value within the distribution and a spread of the distribution and wherein the distribution is a soft decision distribution computed directly without further processing from the equalized demodulated I and Q samples; and
    a bit error probability estimator for calculating the mean and variance of the distribution and for estimating the BEP based on the mean and the variance of the distribution.

12. The apparatus of claim 11, wherein the bit error probability estimator calculates the mean and the variance based on the type of the distribution, and wherein the type of the distribution is either a Gaussian distribution or a Rician distribution.

13. The apparatus of claim 11, further comprising a deinterleaver for deinterleaving the plurality of multi-bit soft decisions.

14. The apparatus of claim 13, wherein the plurality of multi-bit soft decisions comprise symbols each with three bits.

15. The apparatus of claim 13, further comprising a convolutional decoder for convolutionally decoding the deinterleaved plurality of multi-bit soft decisions to obtain at least one single-bit hard decision.

16. The apparatus of claim 15, wherein the plurality of single-bit hard decisions comprise at least one frame of data.

17. The apparatus of claim 11, wherein the bit error probability estimator estimates the BEP by finding the BEP in a lookup table and by using a ratio equaling the mean divided by the variance.

18. The apparatus of claim 11, further comprising a demodulator for demodulating I and Q samples by using a demodulation scheme of either Gaussian minimum shift keying (GMSK) or octal phase shift keying (8-PSK) to obtain the demodulated I and Q samples.

19. The apparatus of claim 11, further comprising an averager for determining a mean BEP by averaging a plurality of bit error probabilities comprising the BEP.

20. The apparatus of claim 9, further comprising:
    a filter for filtering the mean BEP; and
    a quantizer for quantizing the filtered mean BEP for transmission.

21. An apparatus for estimating a bit error probability (BEP), comprising:
    means for equalizing demodulated I and Q samples to obtain a plurality of multi-bit soft decisions, wherein the demodulated I and Q samples exhibit the BEP and the plurality of multi-bit soft decisions include a distribution with a mean and a variance;
    means for determining a type of the distribution based on a maximum value of the distribution, a location of the maximum value within the distribution and a spread of the distribution and wherein the distribution is a soft decision distribution computed directly without further processing from the equalized demodulated I and Q samples;
    means for calculating the mean and variance of the distribution; and
    means for estimating the BEP based on the mean and the variance of the distribution.

22. The apparatus of claim 21, wherein the means for calculating calculates the mean and the variance based on the type of the distribution, and wherein the type of the distribution is either a Gaussian distribution or a Rician distribution.

23. The apparatus of claim 21, further comprising means for deinterleaving the plurality of multi-bit soft decisions.

24. The apparatus of claim 23, wherein the plurality of multi-bit soft decisions comprise symbols each with three bits.

25. The apparatus of claim 23, further comprising means for convolutionally decoding the deinterleaved plurality of multi-bit soft decisions to obtain at least one single-bit hard decision.

26. The apparatus of claim 25, wherein the plurality of single-bit hard decisions comprise at least one frame of data.

27. The apparatus of claim 21, wherein the means for estimating estimates the BEP by finding the BEP in a lookup table and by using a ratio equaling the mean divided by the variance.

28. The apparatus of claim 21, further comprising means for demodulating I and Q samples by using a demodulation scheme of either Gaussian minimum shift keying (GMSK) or octal phase shift keying (8-PSK) to obtain the demodulated I and Q samples.

29. The apparatus of claim 21, further comprising means for determining a mean BEP by averaging a plurality of bit error probabilities comprising the BEP.

30. The apparatus of claim 29, further comprising:
    means for filtering the mean BEP; and
    means for quantizing the filtered mean BEP for transmission.

31. A computer-readable medium storing a computer program, wherein execution of the computer program is for:
    equalizing demodulated I and Q samples to obtain a plurality of multi-bit soft decisions, wherein the demodulated I and Q samples exhibit the BEP and the plurality of multi-bit soft decisions include a distribution with a mean and a variance;
    determining a type of the distribution based on a maximum value of the distribution, a location of the maximum value within the distribution and a spread of the distribution and wherein the distribution is a soft decision distribution computed directly without further processing from the equalized demodulated I and Q samples;
    calculating the mean and variance of the distribution; and
    estimating the BEP based on the mean and the variance of the distribution.

* * * * *